United States Patent
Minagawa

(10) Patent No.: US 12,392,693 B2
(45) Date of Patent: Aug. 19, 2025

(54) HYDROPHILIC SUBSTRATE AND METHOD FOR PREPARING HYDROPHILIC SUBSTRATE

(71) Applicant: Sumitomo Rubber Industries, Ltd., Kobe (JP)

(72) Inventor: Yasuhisa Minagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 967 days.

(21) Appl. No.: 17/244,001

(22) Filed: Apr. 29, 2021

(65) Prior Publication Data
US 2021/0372895 A1    Dec. 2, 2021

(30) Foreign Application Priority Data

May 27, 2020    (JP) .................................. 2020-092434

(51) Int. Cl.
*G01N 1/40*    (2006.01)
*C08F 120/28*    (2006.01)
(Continued)

(52) U.S. Cl.
CPC ......... *G01N 1/4077* (2013.01); *C08F 120/28* (2013.01); *C09D 133/14* (2013.01); *B32B 27/06* (2013.01); *B32B 27/30* (2013.01); *B32B 27/304* (2013.01); *B32B 27/308* (2013.01); *B32B 27/322* (2013.01); *B32B 2327/00* (2013.01); *B32B 2331/04* (2013.01); *B32B 2333/04* (2013.01); *B32B 2333/08* (2013.01); *B32B 2333/12* (2013.01)

(58) Field of Classification Search
CPC ... G01N 1/4077; C08F 120/28; C09D 133/14; B32B 27/06; B32B 27/30; B32B 27/304; B32B 27/308; B32B 27/322; B32B 2327/00; B32B 2331/04; B32B 2333/04; B32B 2333/08; B32B 2333/12
See application file for complete search history.

(56) References Cited

U.S. PATENT DOCUMENTS

| | | | |
|---|---|---|---|
| 4,876,126 | A | 10/1989 | Takemura et al. |
| 5,079,093 | A | 1/1992 | Akashi et al. |

(Continued)

FOREIGN PATENT DOCUMENTS

| | | |
|---|---|---|
| CA | 2 259 073 A1 | 7/1999 |
| EP | 0930331 * | 7/1999 |

(Continued)

*Primary Examiner* — Samir Shah
(74) *Attorney, Agent, or Firm* — Birch, Stewart, Kolasch & Birch, LLP

(57) ABSTRACT

Provided are hydrophilic substrates provided with a hydrophilic polymer layer having controlled surface uniformity and irregularities, and methods for preparing the hydrophilic substrates. Included are hydrophilic substrates including a substrate having a surface containing at least one group represented by $-N(R^1)_2$ or $-N(R^2)_3^+$ wherein each $R^1$ or $R^2$ is the same or different and represents a hydrogen atom or a substituted or unsubstituted hydrocarbon group optionally containing a hetero atom; and a hydrophilic polymer layer provided on the surface of the substrate.

6 Claims, 1 Drawing Sheet

Example 4

Example 5

Comparative Example 1

(51) Int. Cl.
*C09D 133/14* (2006.01)
*B32B 27/06* (2006.01)
*B32B 27/30* (2006.01)
*B32B 27/32* (2006.01)

(56) References Cited

U.S. PATENT DOCUMENTS

| | | | |
|---|---|---|---|
| 2006/0078587 A1* | 4/2006 | Leong | C08L 67/02 |
| | | | 523/205 |
| 2006/0286661 A1* | 12/2006 | Gu | B01L 3/5085 |
| | | | 435/287.1 |
| 2012/0015440 A1 | 1/2012 | Otsuka et al. | |
| 2014/0039084 A1* | 2/2014 | Minagawa | C08F 279/00 |
| | | | 522/46 |
| 2018/0087017 A1 | 3/2018 | Minagawa et al. | |
| 2018/0217294 A1* | 8/2018 | Hyuugaji | C08F 220/58 |

FOREIGN PATENT DOCUMENTS

| | | |
|---|---|---|
| JP | 60-259269 A | 12/1985 |
| JP | 11-315157 A | 11/1999 |
| JP | 2001-96938 A | 4/2001 |
| JP | 2005-523981 A | 8/2006 |
| JP | 2010-65082 A | 3/2010 |
| JP | 2018-59901 A | 4/2018 |
| WO | WO 90/01344 A1 | 2/1990 |
| WO | WO 03/093357 A1 | 11/2003 |
| WO | WO 2018/074432 A1 | 4/2018 |

* cited by examiner

Example 4
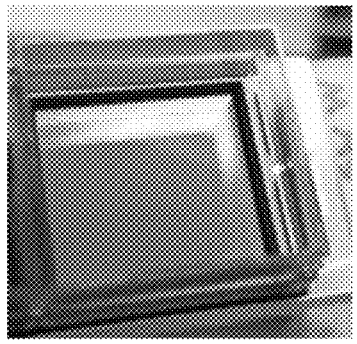
Example 5
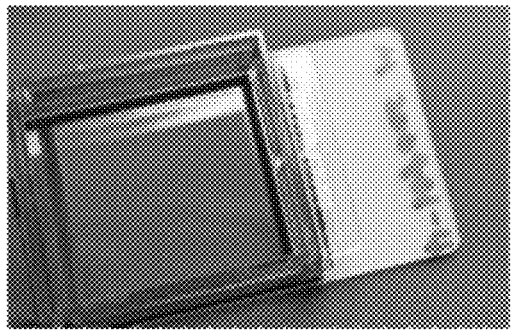
Comparative Example 1
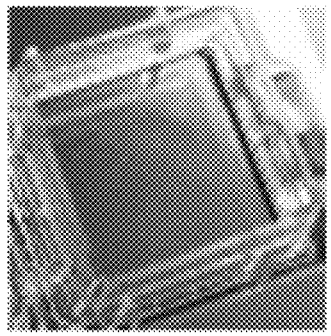

HYDROPHILIC SUBSTRATE AND METHOD FOR PREPARING HYDROPHILIC SUBSTRATE

TECHNICAL FIELD

The present invention relates to hydrophilic substrates including a hydrophilic polymer layer provided on a surface of a substrate, and methods for preparing the hydrophilic substrates.

BACKGROUND ART

It has been proposed to coat the surface of substrates with special polymers in order to prepare devices for capturing specific cells (e.g., blood cells, cancer cells present in blood or biological fluid) from blood or biological fluid.

However, it is difficult for some special polymers to form a smooth surface by coating. Since surface irregularities affect the ability to capture specific cells, it is desirable to provide substrates having controlled surface irregularities which exhibit excellent properties such as the ability to capture specific cells such as cancer cells (see, for example, Patent Literature 1).

CITATION LIST

Patent Literature

Patent Literature 1: JP 2005-523981 T

SUMMARY OF INVENTION

Technical Problem

The present invention aims to solve the above problem and provide hydrophilic substrates provided with a hydrophilic polymer layer having controlled surface uniformity and irregularities, and methods for preparing the hydrophilic substrates.

Solution to Problem

The present invention relates to hydrophilic substrates, including: a substrate having a surface containing at least one group represented by —N(R$^1$)$_2$ or —N(R$^2$)$_3$$^+$ wherein each R$^1$ or R$^2$ is the same or different and represents a hydrogen atom or a substituted or unsubstituted hydrocarbon group optionally containing a hetero atom; and a hydrophilic polymer layer provided on the surface of the substrate.

In the hydrophilic substrates, the at least one group represented by —N(R$^1$)$_2$ or —N(R$^2$)$_3$$^+$ is preferably introduced by treating the surface of the substrate with a silane coupling agent containing the at least one group represented by —N(R$^1$)$_2$ or —N(R$^2$)$_3$$^+$.

In the hydrophilic substrates, the hydrophilic polymer layer is preferably formed from at least one of a hydrophilic polymer solution or a hydrophilic polymer dispersion.

In the hydrophilic substrates, the hydrophilic polymer layer is preferably formed of at least one hydrophilic polymer selected from the group consisting of polymers represented by the following formula (I):

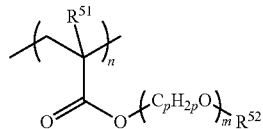

(I)

wherein R$^{51}$ represents a hydrogen atom or a methyl group; R$^{52}$ represents an alkyl group; p represents 1 to 8; m represents 1 to 5; and n represents the number of repetitions.

In the hydrophilic substrates, the hydrophilic polymer layer is preferably formed of a copolymer of at least one hydrophilic monomer selected from the group consisting of compounds represented by the following formula (II) with another monomer:

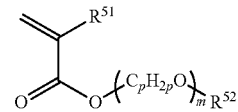

(II)

wherein R$^{51}$, R$^{52}$, p, and m are as defined above.

In the hydrophilic substrates, the hydrophilic polymer layer preferably has a thickness of 10 to 1000 nm.

In the hydrophilic substrates, the hydrophilic polymer layer preferably has fibronectin adsorbed to a surface thereof.

The present invention also relates to methods for preparing a hydrophilic substrate, including forming a hydrophilic polymer layer on a surface of a substrate, the surface of the substrate containing at least one group represented by —N(R$^1$)$_2$ or —N(R$^2$)$_3$$^+$ wherein each R$^1$ or R$^2$ is the same or different and represents a hydrogen atom or a substituted or unsubstituted hydrocarbon group optionally containing a hetero atom.

In the methods for preparing a hydrophilic substrate, the at least one group represented by —N(R$^1$)$_2$ or —N(R$^2$)$_3$$^+$ is preferably introduced by treating the surface of the substrate with a silane coupling agent containing the at least one group represented by —N(R$^1$)$_2$ or —N(R$^2$)$_3$$^+$.

In the methods for preparing a hydrophilic substrate, the hydrophilic polymer layer is preferably formed from at least one of a hydrophilic polymer solution or a hydrophilic polymer dispersion.

In the methods for preparing a hydrophilic substrate, the hydrophilic polymer layer is preferably formed of at least one hydrophilic polymer selected from the group consisting of polymers represented by the following formula (I):

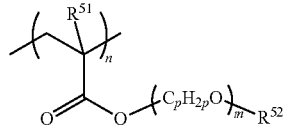

(I)

wherein R$^{51}$ represents a hydrogen atom or a methyl group; R$^{52}$ represents an alkyl group; p represents 1 to 8; m represents 1 to 5; and n represents the number of repetitions.

In the methods for preparing a hydrophilic substrate, the hydrophilic polymer layer is preferably formed of a copolymer of at least one hydrophilic monomer selected from the group consisting of compounds represented by the following formula (II) with another monomer:

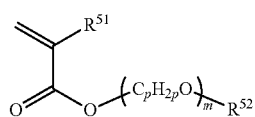

wherein $R^{51}$, $R^{52}$, p, and m are as defined above.

In the methods for preparing a hydrophilic substrate, the hydrophilic polymer layer preferably has a thickness of 10 to 1000 nm.

In the methods for preparing a hydrophilic substrate, the hydrophilic polymer layer preferably has fibronectin adsorbed to a surface thereof.

Advantageous Effects of Invention

The hydrophilic substrates of the present invention include a substrate having a surface containing at least one group represented by —$N(R^1)_2$ or —$N(R^2)_3^+$ wherein each $R^1$ or $R^2$ is the same or different and represents a hydrogen atom or a substituted or unsubstituted hydrocarbon group optionally containing a hetero atom, and a hydrophilic polymer layer provided on the surface of the substrate. Thus, the present invention provides hydrophilic substrates provided with a hydrophilic polymer layer having controlled surface uniformity and irregularities. This is expected to provide an improved ability to capture specific cells such as cancer cells and reduced variations in the capturing ability.

BRIEF DESCRIPTION OF DRAWINGS

FIG. 1 shows exemplary photographs of the hydrophilic substrates prepared in Examples 4 and 5 and Comparative Example 1.

DESCRIPTION OF EMBODIMENTS

The hydrophilic substrates of the present invention include a substrate having a surface containing at least one group represented by —$N(R^1)_2$ or —$N(R^2)_3^+$ wherein each $R^1$ or $R^2$ is the same or different and represents a hydrogen atom or a substituted or unsubstituted hydrocarbon group optionally containing a hetero atom, and a hydrophilic polymer layer provided on the surface of the substrate. By forming a hydrophilic polymer layer on a substrate surface to which at least one group represented by —$N(R^1)_2$ or —$N(R^2)_3^+$ has previously been introduced, it is possible to provide a hydrophilic substrate having a predetermined region coated with a highly smooth hydrophilic polymer layer having controlled surface uniformity and irregularities and a small surface roughness. This is expected to provide an improved ability to capture specific cells such as cancer cells and reduced variations in the capturing ability.

Since the number of tumor cells (e.g., cancer cells) appearing in biological fluid, such as circulating tumor cells (several to hundreds of cells/1 ml of blood), is very small, it is considered important to capture as many tumor cells present in the sampled biological fluid as possible to analyze them. According to the present invention, a surface of a substrate to which at least one group represented by —$N(R^1)_2$ or —$N(R^2)_3^+$ has been introduced may be coated with a hydrophilic polymer to form a highly smooth hydrophilic polymer layer having controlled surface uniformity and irregularities and a small surface roughness. As the surface uniformity and irregularities of the hydrophilic polymer layer affect the ability to capture specific cells such as cancer cells, the substrate having a highly smooth surface with controlled surface uniformity and irregularities is expected to provide an excellent ability to capture specific cells. It is also expected that only small variations in the capturing ability will occur. Thus, it is expected that by counting the number of tumor cells captured onto the hydrophilic polymer layer on the substrate surface to which a —$N(R^1)_2$ group and/or a —$N(R^2)_3^+$ group has been introduced, one can determine the number of tumor cells in biological fluid, e.g., in order to evaluate the cancer-treating effect. Moreover, the captured tumor cells may be cultured and then used to determine the effects of drugs such as anticancer drugs. This allows one to determine the effects of drugs such as anticancer drugs ex vivo before administration, and also helps to screen drugs such as anticancer drugs.

With regard to the substrate surface containing at least one group represented by —$N(R^1)_2$ or —$N(R^2)_3^+$ (i.e., containing a —$N(R^1)_2$ group and/or a —$N(R^2)_3^+$ group), each $R^1$ in the group represented by —$N(R^1)_2$ or each $R^2$ in the group represented by —$N(R^2)_3^+$ is the same or different and represents: 1) a hydrogen atom; or 2) a substituted or unsubstituted hydrocarbon group optionally containing a hetero atom.

The substituted or unsubstituted hydrocarbon group optionally containing a hetero atom for $R^1$ and $R^2$ may be a linear, branched, or cyclic group. The hetero atom is not limited and examples include oxygen and nitrogen. The substituent is not limited and examples include known groups such as hydroxy and halogen groups (e.g., —Cl, —Br).

The number of these hetero atoms or substituents may be one or two or more.

The number of carbon atoms in the substituted or unsubstituted hydrocarbon group optionally containing a hetero atom is preferably 1 to 20, more preferably 1 to 10, still more preferably 1 to 8.

Examples of the substituted or unsubstituted hydrocarbon group optionally containing a hetero atom include monovalent and divalent hydrocarbon groups.

Examples of the optionally hetero atom-containing substituted or unsubstituted monovalent hydrocarbon groups include optionally hetero atom-containing substituted or unsubstituted linear, branched, or cyclic alkyl, cyclic ether, aryl, aralkyl, and alkoxy groups.

Examples of the optionally hetero atom-containing substituted or unsubstituted linear or branched alkyl groups include a methyl group, an ethyl group, a n-propyl group, an isopropyl group, a n-butyl group, an iso-butyl group, a sec-butyl group, a tert-butyl group, a pentyl group, a hexyl group, a heptyl group, a 2-ethylhexyl group, an octyl group, a nonyl group, a decyl group, and hetero atom-containing groups thereof. Examples of the optionally hetero atom-containing substituted or unsubstituted cyclic alkyl groups include a cyclopropyl group, a cyclobutyl group, a cyclopentyl group, a cyclohexyl group, a cycloheptyl group, a cyclooctyl group, an adamanthyl group, a 1-ethylcyclopentyl group, a 1-ethylcyclohexyl group, and hetero atom-containing groups thereof. Examples of the optionally hetero atom-containing substituted or unsubstituted cyclic ether groups include an oxirane group, an oxetane group, an oxolane group, an oxane group, an oxepane group, an oxocane group, an oxonane group, an oxecane group, an oxete group, an oxole group, a dioxolane group, a dioxane group, a dioxepane group, a dioxecane group, and hetero atom-containing groups thereof. Examples of the optionally hetero atom-containing substituted or unsubstituted aryl groups include a phenyl group, a tolyl group, a xylyl group, a biphenyl group, a naphthyl group, an anthryl group, a phenanthryl group, and hetero atom-containing groups thereof. Examples of the optionally hetero atom-containing substituted or unsubstituted aralkyl groups include a benzyl group, a phenethyl group, and hetero atom-containing groups thereof. Examples of the optionally hetero atom-containing substituted or unsubstituted alkoxy groups include a methoxy group, an ethoxy group, a n-propoxy group, an isopropoxy group, a n-butoxy group, a sec-butoxy group, an isobutoxy group, a t-butoxy group, a n-pentyloxy group, a n-hexyloxy group, and hetero atom-containing groups thereof.

Examples of the optionally hetero atom-containing substituted or unsubstituted divalent hydrocarbon groups include optionally hetero atom-containing substituted or unsubstituted alkylene, alkenylene, cycloalkylene, cycloalkylalkylene, arylene, aralkylene, and oxyalkylene groups.

Specific examples of the optionally hetero atom-containing substituted or unsubstituted alkylene groups include a methylene group, an ethylene group, a trimethylene group, a tetramethylene group, a pentamethylene group, a hexamethylene group, an octylene group, a nonylene group, a decylene group, a 1,2-propylene group, and hetero atom-containing groups thereof. Examples of the optionally hetero atom-containing substituted or unsubstituted alkenylene groups include a vinylene group, a 1-propenylene group, a 2-propenylene group, and hetero atom-containing groups thereof. Examples of the optionally hetero atom-containing substituted or unsubstituted cycloalkylene groups include a cyclohexylene group and hetero atom-containing groups thereof. Examples of the optionally hetero atom-containing substituted or unsubstituted cycloalkylalkylene groups include a cyclohexylmethylene group and hetero atom-containing groups thereof. Examples of the optionally hetero atom-containing substituted or unsubstituted arylene groups include a phenylene group, a tolylene group, a xylylene group, and hetero atom-containing groups thereof. Examples of the optionally hetero atom-containing substituted or unsubstituted aralkylene groups include a benzylidene group and hetero atom-containing groups thereof. Examples of the optionally hetero atom-containing substituted or unsubstituted oxyalkylene groups include an oxyethylene group, an oxypropylene group, an oxybutylene group, an oxytetramethylene group, and hetero atom-containing groups thereof.

With regard to the substrate surface containing at least one group represented by $-N(R^1)_2$ or $-N(R^2)_3^+$, examples of the substrate include glass such as soda-lime glass and borosilicate glass, acrylic resins (polyacrylic resins) such as polymethyl acrylate, polymethyl methacrylate, polyacrylic acid, and polymethacrylic acid, cycloolefin resins (polycycloolefins), carbonate resins (polycarbonates), styrene resins (polystyrenes), polyester resins such as polyethylene terephthalate (PET), and polydimethylsiloxanes. Polyacrylic resins and soda-lime glass are preferred among these because it is preferred for the structural material to be coated with a hydrophilic polymer to have higher hydrophilicity.

The substrate surface containing at least one group represented by $-N(R^1)_2$ or $-N(R^2)_3^+$ can be formed by any method capable of introducing the at least one group represented by $-N(R^1)_2$ or $-N(R^2)_3^+$ to a surface of the above-described substrate. The introduction method may be carried out, for example, by treating a substrate surface with a silane coupling agent containing the at least one group represented by $-N(R^1)_2$ or $-N(R^2)_3^+$ (silane coupling agent treatment) or by treating a substrate surface with $NH_3$ gas ($NH_3$ gas treatment). From the standpoint of controlling the surface uniformity and irregularities of the hydrophilic polymer layer, the silane coupling agent treatment is preferred among these.

Any silane coupling agent containing the at least one group represented by $-N(R^1)_2$ or $-N(R^2)_3^+$ may be used in the silane coupling agent treatment, and examples include compounds containing at least one group represented by $-N(R^1)_2$ or $-N(R^2)_3^+$ and a group represented by $-Si(R^3)_3$, wherein each $R^1$ or $R^2$ is the same or different and represents a hydrogen atom or a substituted or unsubstituted hydrocarbon group optionally containing a hetero atom, and each $R^3$ is the same or different and represents a substituted or unsubstituted hydrocarbon group optionally containing a hetero atom.

Each $R^3$ in the group of $-Si(R^3)_3$ is the same or different and represents a substituted or unsubstituted hydrocarbon group optionally containing a hetero atom. Examples of the substituted or unsubstituted hydrocarbon group optionally containing a hetero atom include those as described for the optionally hetero atom-containing substituted or unsubstituted monovalent hydrocarbon groups for $R^1$ and $R^2$. Preferred among these are linear, branched, or cyclic alkyl groups and alkoxy groups. Specific examples of the linear, branched, or cyclic alkyl groups and alkoxy groups include those as described for $R^1$ and $R^2$ (e.g., a methyl group, an ethyl group, a methoxy group, an ethoxy group). Moreover, preferably at least one of the $R^3$ groups is an alkoxy group. More preferably, two, still more preferably three, of the $R^3$ groups are alkoxy groups.

Suitable examples of the compounds containing at least one group represented by $-N(R^1)_2$ or $-N(R^2)_3^+$ and a group represented by $-Si(R^3)_3$ include compounds represented by the following formulas (1-1) and (1-2).

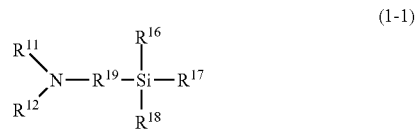

(1-1)

In formula (1-1), $R^{11}$ and $R^{12}$ are the same or different and each represent a hydrogen atom or a substituted or unsubstituted monovalent hydrocarbon group optionally containing a hetero atom; $R^{16}$ to $R^{18}$ are the same or different and each represent a substituted or unsubstituted monovalent hydrocarbon group optionally containing a hetero atom; and $R^{19}$ represents a substituted or unsubstituted divalent hydrocarbon group optionally containing a hetero atom.

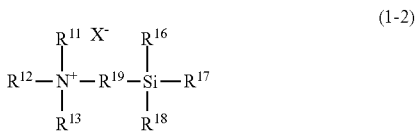

(1-2)

In formula (1-2), $R^{11}$ to $R^{13}$ are the same or different and each represent a hydrogen atom or a substituted or unsubstituted monovalent hydrocarbon group optionally containing a hetero atom; $R^{16}$ to $R^{18}$ are the same or different and each represent a substituted or unsubstituted monovalent hydrocarbon group optionally containing a hetero atom; $R^{19}$ represents a substituted or unsubstituted divalent hydrocarbon group optionally containing a hetero atom; and X represents a halogen.

Examples of the "substituted or unsubstituted monovalent hydrocarbon group optionally containing a hetero atom" for $R^{11}$, $R^{12}$, and $R^{13}$ in formulas (1-1) and (1-2) include those as described for the optionally hetero atom-containing substituted or unsubstituted monovalent hydrocarbon groups for $R^1$ and $R^2$. In particular, $R^{11}$, $R^{12}$, and $R^{13}$ are each preferably a hydrogen atom or a linear or branched alkyl group optionally containing a hetero atom, more preferably a hydrogen atom, a linear or branched alkyl group, or a group represented by $—C_pH_{2p}—O—C_qH_{2q+1}$ where p and q each represent an integer.

Examples of the "substituted or unsubstituted monovalent hydrocarbon group optionally containing a hetero atom" for $R^{16}$, $R^{17}$, and $R^{18}$ in formulas (1-1) and (1-2) include those as described for the optionally hetero atom-containing substituted or unsubstituted monovalent hydrocarbon groups for $R^1$ and $R^2$. In particular, $R^{16}$, $R^{17}$, and $R^{18}$ are each preferably a substituted or unsubstituted alkoxy group optionally containing a hetero atom, more preferably an alkoxy group, still more preferably a methoxy group or an ethoxy group.

Examples of the "substituted or unsubstituted divalent hydrocarbon group optionally containing a hetero atom" for $R^{19}$ in formulas (1-1) and (1-2) include those as described for the optionally hetero atom-containing substituted or unsubstituted divalent hydrocarbon groups for $R^1$ and $R^2$. In addition to the specific examples of the optionally hetero atom-containing substituted or unsubstituted divalent hydrocarbon groups for $R^1$ and $R^2$, examples also include groups represented by $—CO—N(R^{111})—(R^{112})—$ where $R^{111}$ represents a hydrogen atom or an alkyl group, and $R^{112}$ represents a group represented by $—C_pH_{2p}—$ where p represents an integer of 1 to 8. In particular, R19 is preferably a substituted or unsubstituted alkylene group optionally containing a hetero atom, or a group represented by $—CO—N(R^{111})—(R^{112})—$, more preferably a methylene group, an ethylene group, a trimethylene group, a tetramethylene group, or a group represented by $—CO—N(R^{111})—(R^{112})—$.

Examples of the halogen for X in formula (1-2) include chlorine (chlorine ion) and bromine (bromine ion).

Other suitable examples of the compounds containing at least one group represented by $—N(R^1)_2$ or $—N(R^2)_3^+$ and a group represented by $—Si(R^3)_3$ include compounds represented by the following formula (1-3):

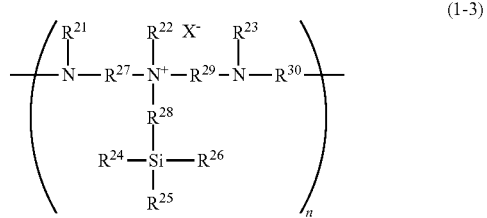

(1-3)

wherein $R^{21}$ to $R^{23}$ are the same or different and each represent a hydrogen atom or a substituted or unsubstituted monovalent hydrocarbon group optionally containing a hetero atom; $R^{24}$ to $R^{26}$ are the same or different and each represent a substituted or unsubstituted monovalent hydrocarbon group optionally containing a hetero atom; $R^{27}$ to $R^{30}$ each represent a substituted or unsubstituted divalent hydrocarbon group optionally containing a hetero atom; X represents a halogen; and n represents the number of repetitions.

Examples of the "substituted or unsubstituted monovalent hydrocarbon group optionally containing a hetero atom" for $R^{21}$, $R^{22}$, and $R^{23}$ in formula (1-3) include those as described for the optionally hetero atom-containing substituted or unsubstituted monovalent hydrocarbon groups for $R^1$ and $R^2$. In particular, $R^{21}$, $R^{22}$, and $R^{23}$ are each preferably a hydrogen atom or a linear or branched alkyl group optionally containing a hetero atom, more preferably a hydrogen atom.

Examples of the "substituted or unsubstituted monovalent hydrocarbon group optionally containing a hetero atom" for $R^{24}$, $R^{25}$, and $R^{26}$ in formula (1-3) include those as described for the optionally hetero atom-containing substituted or unsubstituted monovalent hydrocarbon groups for $R^1$ and $R^2$. In particular, $R^{24}$, $R^{25}$, and $R^{26}$ are each preferably a substituted or unsubstituted alkoxy group optionally containing a hetero atom, more preferably an alkoxy group, still more preferably a methoxy group or an ethoxy group.

Examples of the "substituted or unsubstituted divalent hydrocarbon group optionally containing a hetero atom" for $R^{27}$, $R^{28}$, $R^{29}$, and $R^{30}$ in formula (1-3) include those as described for the optionally hetero atom-containing substituted or unsubstituted divalent hydrocarbon groups for $R^1$ and $R^2$. In particular, R27, R28, $R^{29}$, and $R^{30}$ are each preferably a substituted or unsubstituted alkylene group optionally containing a hetero atom, more preferably a methylene group, an ethylene group, a trimethylene group, or a tetramethylene group.

Examples of the halogen for X in formula (1-3) include chlorine (chlorine ion) and bromine (bromine ion).

The degree of polymerization of the structural unit of formula (1-3) is not limited and may be appropriately selected in view of the processability (coating properties) of the compound, adhesion to the hydrophilic polymer layer, or other factors.

[0048]

The number average molecular weight (Mn) of the compounds (polymers) of formula (1-3) is preferably 500 to 6000, more preferably 1000 to 4000, still more preferably 1000 to 3000.

Specific examples of the silane coupling agent containing the group of $—N(R^1)_2$ include: amino group-containing silane coupling agents such as 3-aminopropyltrimethoxysilane, 3-aminopropyltriethoxysilane, 3-aminopropyltriisopropoxysilane, 3-aminopropylmethyldimethoxysilane, 3-aminopropylmethyldiethoxysilane, 3-(2-aminoethyl)aminopropyltrimethoxysilane, 3-(2-aminoethyl)aminopropylmethyldimethoxysilane, 3-(2-aminoethyl)aminopropyltriethoxysilane, 3-(2-aminoethyl)aminopropylmethyldiethoxysilane, 3-(2-aminoethyl)aminopropyltriisopropoxysilane, 3-(2-(2-aminoethyl)aminoethyl)aminopropyltrimethoxysilane, 3-(6-aminohexyl)aminopropyltrimethoxysilane, 3-(N-ethylamino)-2-methylpropyltrimethoxysilane, N-phenyl-3-aminopropyltrimethoxysilane, N-benzyl-3-aminopropyltrimethoxysilane, N-vinylbenzyl-3-aminopropyltriethoxysilane, N-cyclohexylaminomethyltriethoxysilane, N-cyclohexylaminomethyldiethoxymethylsilane, N-phenylaminomethyltrimethoxysilane, and (2-aminoethyl) aminomethyltrimethoxysilane; and urea group-containing silane coupling agents such as 3-ureidopropyltrimethoxysilane (1-[3-(trimethoxysilyl)propyl]urea), 3-ureidopropyltriethoxysilane, 3-ureidopropyltriisopropoxysilane, 3-ureidopropylmethyldimethoxysilane, 3-ureidopropylmethyldiethoxysilane, ureidomethyltrimethoxysilane, ureidomethyltriethoxysilane, ureidomethyltriisopropoxysilane, ureidomethylmethyldimethoxysilane, ureidomethylmethyldiethoxysilane, 3-[(2-ureidoethyl)amino]propyltrimethoxysilane, 1,3-bis[3-(trimethoxysilyl)propyl]urea, 1,3-bis[3-(triethoxysilyl)propyl]urea, 1-[3-(triethoxysilyl)propyl]-3-phenylurea, 1,3-bis[3-(tripropylsilyl)propyl]urea, 1-[3-(triethoxysilyl)propyl]-3,3-dioctylurea, 1-[3-(triethoxysilyl)propyl]-3,3-dihexadecylurea, 1-[3-(triethoxysilyl)propyl]-3-propylurea, 3-(3-dodecylureido)propyltriethoxysilane, and N-(1-phenylethyl)-N'-[3-(triethoxysilyl)propyl]urea.

Specific examples of the silane coupling agent containing the group of $-N(R^2)_3^+$ include N-trimethoxysilylpropyl-N,N,N-trimethylammonium chloride, N-trimethoxysilylpropyl-N, N, N-tri-n-butylammonium chloride, octadecyldimethyl(3-trimethoxysilyl-propyl)ammonium chloride, N-(trimethoxysilylethyl)benzyl-N,N,N-trimethylammonium chloride, N,N-didecyl-N-methyl-N-(3-trimethoxysilyl-propyl)ammonium chloride, bis(methoxyethyl)-3-trimethoxysilylpropylammonium chloride, trimethoxysilylpropyl modified (polyethylenimine), and dimethoxymethylsilylpropyl modified (polyethylenimine).

Preferred among the silane coupling agents listed above are 3-aminopropyltriethoxysilane, bis(methoxyethyl)-3-trimethoxysilylpropylammonium chloride, trimethoxysilylpropyl modified (polyethylenimine), and N-trimethoxysilylpropyl-N, N, N-trimethylammonium chloride. These silane coupling agents containing at least one group represented by $-N(R^1)_2$ or $-N(R^2)_3^+$ may be used alone or in combinations of two or more.

The silane coupling agent treatment (treating a substrate surface with a silane coupling agent containing the at least one group represented by $-N(R^1)_2$ or $-N(R^2)_3^+$) may be carried out by any method that can coat (treat) a substrate surface with the silane coupling agent. Specifically, a substrate having a surface coated (treated) with the silane coupling agent can be prepared by a known method, such as by coating (applying to), spraying, or immersing a substrate surface using a silane coupling agent solution and/or dispersion prepared by dissolving and/or dispersing the silane coupling agent in any solvent. The coating, spraying, or immersion may by performed by a known method.

The solvent may be any solvent that can dissolve or disperse the silane coupling agent, and may be appropriately selected in accordance with the silane coupling agent used. The solvent may be water, an organic solvent, or a mixture thereof. Examples of the organic solvent include alcohols such as methanol, ethanol, n-propanol, i-propanol, and methoxypropanol; ketones such as acetone and methyl ethyl ketone; tetrahydrofuran, acetonitrile, ethyl acetate, and toluene.

The concentration of the silane coupling agent solution and/or dispersion may be appropriately selected in accordance with the type of silane coupling agent or solvent, the treatment method (coating, spraying, or immersion method), or other factors.

The conditions of the silane coupling agent treatment, such as treatment temperature and time, may be appropriately selected in accordance with the type of silane coupling agent or solvent, the treatment method, or other factors. However, the substrate surface is preferably treated (retained) at a humidity of 50% or higher during the treatment (e.g., coating, spraying, or immersion) with the silane coupling agent solution and/or dispersion. Under such treatment conditions, the chemical bond between the substrate surface and the silane coupling agent tends to become strong. The humidity is more preferably 60% or higher, still more preferably 80% or higher. The upper limit of the humidity is not limited, but is preferably, for example, 100% or lower.

When the substrate surface is treated (retained) at a humidity of 50% or higher, the treatment time and temperature may be appropriately selected, for example, from the standpoint of a strong chemical bond between the substrate surface and the silane coupling agent or from an economic standpoint. For example, the treatment time (retention time) is preferably 1 to 60 hours, more preferably 1 to 20 hours. The treatment temperature (retention temperature) is preferably 20 to 65° C., more preferably 25 to 50° C.

Although the substrate having a surface coated (treated) with the silane coupling agent may be prepared as described above, a commercial product may also be used as the substrate. Examples of the commercial product treated with the silane coupling agent include MAS coated glass slide, MAS-GP type coated glass slide, Frontier coated glass slide, and APS coated glass slide (all available from Matsunami Glass Ind., Ltd.).

From the standpoint of adhesion of the hydrophilic polymer layer to the substrate surface, the substrate surface containing at least one group represented by $-N(R^1)_2$ or $-N(R^2)_3^+$ prepared as described above or by other methods preferably at least partially (partially or entirely) has a water contact angle of 50 to 120 degrees, more preferably 70 to 100 degrees.

The hydrophilic substrates include a substrate having a surface containing at least one group represented by $-N(R^1)_2$ or $-N(R^2)_3^+$ prepared as described above or by other methods, and a hydrophilic polymer layer provided on the surface of the substrate. The hydrophilic polymer for forming the hydrophilic polymer layer may be selected from appropriate polymers having hydrophilicity.

The hydrophilic polymer may be, for example, a homopolymer or copolymer of one or two or more hydrophilic monomers, or a copolymer of one or two or more hydrophilic monomers with one or two or more additional monomers.

The hydrophilic monomers for forming the homopolymer or copolymers may be any monomer containing a hydrophilic group. Examples of the hydrophilic group include known hydrophilic groups such as an amide group, a sulfuric acid group, a sulfonic acid group, a carboxylic acid group, a hydroxy group, an amino group, an amide group, and an oxyethylene group.

Specific examples of the hydrophilic monomers include (meth)acrylic acids, (meth)acrylic acid esters (e.g., alkoxyalkyl (meth)acrylates such as methoxyethyl (meth)acrylates, and hydroxyalkyl (meth)acrylates such as hydroxyethyl (meth)acrylates), (meth)acrylamides, and (meth)acrylamide derivatives containing cyclic groups (e.g., (meth)acryloylmorpholines). Preferred among these are (meth)acrylic acids, (meth)acrylic acid esters, and alkoxyalkyl (meth)acrylates, with alkoxyalkyl (meth)acrylates being more preferred, with 2-methoxyethyl acrylate being particularly preferred.

The additional monomers of the copolymer may be selected from appropriate monomers which do not inhibit the advantageous effect of the hydrophilic polymer. Examples include aromatic monomers such as styrene, vinyl acetate, and N-isopropylacrylamide which can impart temperature responsiveness.

Specific examples of the homopolymer and copolymers include: homopolymers formed from single hydrophilic monomers, such as polyacrylic acid, polyacrylic acid esters, polymethacrylic acid, polymethacrylic acid esters, polyacrylamide, and polymethacrylamide; copolymers formed from two or more of the hydrophilic monomers listed above; and copolymers formed from one or more of the hydrophilic monomers listed above and one or more of the additional monomers listed above. These hydrophilic polymers may be used alone or in combinations of two or more.

In particular, the hydrophilic polymer is preferably at least one selected from the group consisting of polymers represented by the following formula (I):

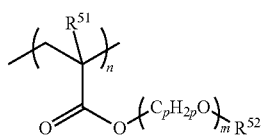

(I)

wherein $R^{51}$ represents a hydrogen atom or a methyl group; $R^{52}$ represents an alkyl group; p represents 1 to 8; m represents 1 to 5; and n represents the number of repetitions.

Suitable examples of the polymers of formula (I) include polymers represented by the following formula (I-1):

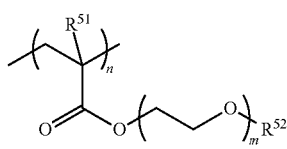

(I-1)

wherein $R^{51}$ represents a hydrogen atom or a methyl group; $R^{52}$ represents an alkyl group; m represents 1 to 5; and n represents the number of repetitions.

The alkyl group for $R^{52}$ preferably has 1 to 10 carbon atoms, more preferably 1 to 5 carbon atoms. In particular, $R^{52}$ is particularly preferably a methyl group or an ethyl group. The symbol p is preferably 1 to 5, more preferably 1 to 3. The symbol m is preferably 1 to 3. The symbol n (the number of repeating units) is preferably 15 to 1500, more preferably 40 to 1200.

Alternatively, the hydrophilic polymer may also suitably be a copolymer of at least one hydrophilic monomer selected from the group consisting of compounds represented by the following formula (II) with another monomer.

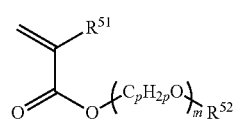

(II)

In formula (II), $R^{51}$, $R^{52}$, p, and m are as defined above.

Suitable examples of the compounds of formula (II) include compounds represented by the following formula (II-1):

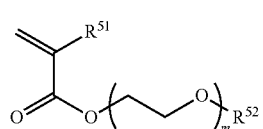

(II-1)

wherein R51, $R^{52}$, and m are as defined above.

Among the hydrophilic polymers mentioned above, the hydrophilic polymers of formula (I) are particularly suitable from the standpoints of surface uniformity and irregularities of the hydrophilic polymer layer, and other properties.

The number average molecular weight (Mn) of the hydrophilic polymer is preferably 8000 to 150000, more preferably 10000 to 60000, still more preferably 12000 to 50000, from the standpoint of selective adsorption and adhesion to cancer cells. Herein, Mn may be determined by gel permeation chromatography (GPC) (GPC-8000 series available from Tosoh Corporation, detector: differential refractometer, column: TSKgel SuperMultipore HZ-M available from Tosoh Corporation) calibrated with polystyrene standards.

The hydrophilic polymer layer (the layer formed of the hydrophilic polymer) preferably has a thickness of 10 to 1000 nm, more preferably 30 to 700 nm, still more preferably 50 to 400 nm. When the thickness is adjusted within the range indicated above, selective capture of cancer cells and low adsorption of other proteins and cells can be well achieved.

The surface of the hydrophilic polymer layer (the surface of the hydrophilic polymer layer of the hydrophilic substrates) preferably at least partially (partially or entirely) has a water contact angle of not larger than 70 degrees but not smaller than 20 degrees, more preferably not larger than 60 degrees but not smaller than 30 degrees.

The surface of the hydrophilic polymer layer (the surface of the hydrophilic polymer layer of the hydrophilic substrates) preferably has a surface roughness Ra of 0.30 μm or less, more preferably 0.20 μm or less, still more preferably 0.18 μm or less. The lower limit of the Ra is not limited, and a lower Ra is better. Herein, the surface roughness Ra refers to the center-line surface roughness Ra defined in JIS B0601-2001.

A substrate provided with a hydrophilic polymer layer formed of a hydrophilic polymer can be prepared by dissolving and/or dispersing a hydrophilic polymer in any solvent to prepare a hydrophilic polymer solution and/or dispersion, and entirely or partially coating a substrate surface containing at least one group represented by —N($R^1$)$_2$ or —N($R^2$)$_3^+$ with the hydrophilic polymer solution and/or dispersion by a known method, such as 1) by injecting the hydrophilic polymer solution and/or dispersion onto the substrate surface (e.g., the recess of the substrate) and retaining and drying it for a predetermined time, or 2) by applying (spraying) the hydrophilic polymer solution and/or dispersion to the substrate surface and retaining and drying it for a predetermined time. Then, the substrate provided with a hydrophilic polymer layer may be combined with other components as needed, to prepare a device capable of, for example, capturing, culturing, and/or analyzing specific cells.

The solvent, injection method, application (spraying) method, and other conditions may be conventionally known materials or methods.

retention/drying time in the method 1) or 2) may be appropriately selected in accordance with the size of the substrate, the type of liquid introduced, and other factors. The retention time is preferably five minutes to ten hours, more preferably ten minutes to five hours, still more preferably 15 minutes to two hours. The drying is preferably performed at room temperature (about 23° C.) to 80° C., more preferably at room temperature to 50° C. Moreover, the drying may be carried out under reduced pressure. Furthermore, after the predetermined time of retention, the excess hydrophilic polymer solution and/or dispersion may be discharged as appropriate before drying.

The solvent may be any solvent that can dissolve a hydrophilic polymer and may be appropriately selected in accordance with the hydrophilic polymer used. Examples include the solvents that may be used to dissolve or disperse the silane coupling agent described above.

The hydrophilic polymer layer may have fibronectin adsorbed to a surface thereof. The adsorption of fibronectin to the surface of the hydrophilic polymer layer results in improved capture of specific cells such as cancer cells.

Fibronectin may be adsorbed onto the hydrophilic polymer layer by any known method, for example, by bringing the hydrophilic polymer layer into contact with a buffer solution (e.g., phosphate buffered saline (PBS)) containing fibronectin by a known method, and leaving them at a predetermined temperature for a predetermined time, optionally followed by washing. The temperature and time may be selected as appropriate, and may be, for example, about 10 to 60° C. and about 0.1 to 24 hours, respectively.

From the standpoint of adsorbing fibronectin onto the hydrophilic polymer layer, it is suitable to use, for example, a solution or dispersion preferably having a fibronectin concentration adjusted to 0.5 to 500 µg/ml, more preferably 1 to 250 µg/ml. With a fibronectin concentration adjusted within the range indicated above, excellent capture of specific cells such as cancer cells can be achieved.

The methods for preparing a hydrophilic substrate of the present invention include forming a hydrophilic polymer layer on a surface of a substrate which contains at least one group represented by —N($R^1$)$_2$ or —N($R^2$)$_3^+$ wherein each $R^1$ or $R^2$ is the same or different and represents a hydrogen atom or a substituted or unsubstituted hydrocarbon group optionally containing a hetero atom. As described above, a highly smooth hydrophilic polymer layer having controlled surface uniformity and irregularities and a small surface roughness can be formed by first introducing at least one group represented by —N($R^1$)$_2$ or —N($R^2$)$_3^+$ to a substrate surface and then forming a hydrophilic polymer layer on the surface to which the group has been introduced.

The methods for preparing a hydrophilic substrate are expected, for example, to provide an improved ability to capture specific cells and reduced variations in the capturing ability by bringing a sample (e.g., blood, biological fluid) into contact with the hydrophilic substrate including a hydrophilic polymer layer provided on a substrate surface to which at least one group represented by —N($R^1$)$_2$ or —N($R^2$)$_3^+$ has been introduced. Then, it is expected that by counting the number of captured specific cells, one can determine the number of specific cells in the sampled blood or biological fluid, e.g., in order to evaluate the cancer-treating effect.

EXAMPLES

The present invention is specifically described with reference to, but not limited to, examples below.

(Preparation of Hydrophilic Polymer)

Using a solution of azobisisobutyronitrile (AIBN) in toluene (12.5 mg/mL), 2-methoxyethyl acrylate (a 25 wt % toluene solution) was thermally polymerized at 60° C. for seven hours to prepare poly(2-methoxyethyl acrylate) (PMEA).

Example 1

A 1N NaOH aqueous solution was added to a chamber slide (bottom: soda-lime glass) and allowed to stand for one hour. Then, the chamber surface was washed with water and naturally dried. Next, a 0.5% solution (methanol/water (=50/50) mixed solution) of 3-aminopropyltriethoxysilane (A0439 available from Tokyo Chemical Industry Co., Ltd.) was added to the chamber slide and allowed to stand at a humidity of 80% and a temperature of 40° C. for five hours, followed by vacuum drying at 60° C. The chamber slide was then washed with water and dried. To the chamber slide was injected a 0.25% methanol solution of the PMEA prepared above. Immediately thereafter, the chamber slide was vacuum dried in an oven at 40° C. for five minutes to prepare a hydrophilic substrate.

Example 2

A hydrophilic substrate was prepared as in Example 1, except that the silane coupling agent used was changed from 3-aminopropyltriethoxysilane to bis(methoxyethyl)-3-trimethoxysilylpropylammonium chloride (SIB 1500 available from Gelest, Inc., represented by the following formula).

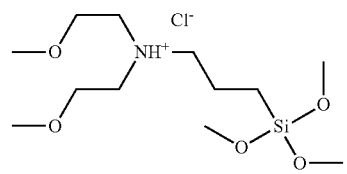

Example 3

A hydrophilic substrate was prepared as in Example 1, except that the silane coupling agent used was changed from 3-aminopropyltriethoxysilane to trimethoxysilylpropyl modified (polyethylenimine) (SSP-060 available from Gelest, Inc., represented by the following formula, Mn: 1500 to 1800).

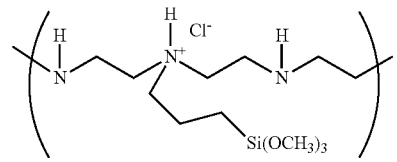

Example 4

A commercial product (chamber slide available from Matsunami Glass Ind., Ltd., MAS coated type) having a surface to which a $NH_3^+$ group had been introduced was used instead of the prepared chamber slide. To the commercial chamber slide was injected a 0.25% methanol solution of the PMEA prepared above. Immediately thereafter, the chamber slide was vacuum dried in an oven at 40° C. for five minutes to prepare a hydrophilic substrate.

Example 5

Further, fibronectin was adsorbed onto the chamber slide obtained after vacuum drying in an oven at 40° C. for five minutes in Example 4. Specifically, a 200 µg/ml PBS (phosphate buffered saline) solution of fibronectin was prepared, injected, and allowed to stand at 40° C. for one hour, followed by washing with a PBS solution to prepare a hydrophilic substrate.

Comparative Example 1

To an untreated chamber slide was injected a 0.25% methanol solution of the PMEA prepared above. Immediately thereafter, the chamber slide was vacuum dried in an oven at 40° C. for five minutes to prepare a hydrophilic substrate.

[Water contact angle (of substrate surface containing —N(R$^1$)$_2$ or —N(R$^2$)$_3^+$ group)]

To the substrate surface to which a group represented by —N(R$^1$)$_2$ or —N(R$^2$)$_3^+$ had been introduced was dropwise added 2 μL of distilled water. Thirty seconds later, the contact angle was measured by a θ/2 method (at room temperature).

In Comparative Example 1, the contact angle was measured on the untreated glass slide.

[Thickness of Hydrophilic Polymer Layer (Coating Layer)]

The thickness of the hydrophilic polymer layer of the hydrophilic substrate was determined by measuring (photographing) a cross-section of the hydrophilic polymer layer using a TEM at an accelerating voltage of 15 kV and a magnification of 1000 times.

[Surface Roughness Ra (Hydrophilic Polymer Layer)]

The surface roughness of each hydrophilic substrate (hydrophilic polymer layer) was measured contactless at four points (first peak) using a laser microscope. The average of the four Ra values was taken as the surface roughness Ra (the average of the center-line surface roughnesses Ra defined in JIS B0601-2001).

TABLE 1

| | Example 1 | Example 2 | Example 3 | Example 4 | Example 5 | Comparative Example 1 |
|---|---|---|---|---|---|---|
| Water contact angle (degrees) on substrate surface containing —N(R$^1$)$_2$ or —N(R$^2$)$_3^+$ group | 74.2 | 76.6 | 82.4 | 95.7 | 95.7 | 58.2 |
| Thickness (nm) of hydrophilic polymer layer (coating layer) | 165 | 140 | 145 | 140 | 150 | 185 |
| Surface roughness (Ra) of hydrophilic polymer layer | 0.142 | 0.118 | 0.131 | 0.096 | 0.158 | 0.386 |

Among the photographs of the coating substrates prepared in Examples 1 to 5 and Comparative Example 1, those of Examples 4 and 5 and Comparative Example 1 are shown in FIG. 1.

In Comparative Example 1, the entire surface appeared slightly white and cloudy with white spots. Such cloudiness was observed in all the substrates prepared using poly(2-methoxyethyl acrylate) as in Comparative Example 1 though it was in the form of a ring or spots in some substrates.

In contrast, in Examples 4 and 5 using a substrate having a surface containing a —N(R$^1$)$_2$ or —N(R$^2$)$_3^+$ group, an unclouded (Example 4) or very thin (Example 5) coating layer having controlled surface uniformity and irregularities was formed. Since the cloudy parts reflect aggregation of poly(2-methoxyethyl acrylate) and surface irregularities, it is easily conceivable that such parts have a different ability to capture specific cells than the other smooth parts, thus causing variations in the capturing ability. For this reason, it was expected that the unclouded surface with controlled surface uniformity and irregularities (Ra: 0.30 or less) would exhibit less variations in the capturing ability.

The invention claimed is:

1. A hydrophilic substrate, comprising:
a substrate having a surface containing at least one group represented by —N(R$^1$)$_2$ or —N(R$^2$)$_3^+$ wherein each R$^1$ or R$^2$ is the same or different and represents a hydrogen atom or a substituted or unsubstituted hydrocarbon group optionally containing a hetero atom; and
a hydrophilic polymer layer provided on the surface of the substrate,
wherein the at least one group represented by —N(R$^1$)$_2$ or —N(R$^2$)$_3^+$ is introduced by treating the surface of the substrate with a silane coupling agent containing the at least one group represented by —N(R$^1$)$_2$ or —N(R$^2$)$_3^+$,
wherein the silane coupling agent is at least one selected from the group consisting of compounds represented by the following formulas (1-2) and (1-3 )

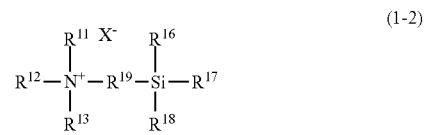

(1-2)

wherein in formula (1-2),
R$^{11}$ to R$^{13}$ are the same or different and each represent a hydrogen atom or a substituted or unsubstituted monovalent hydrocarbon group optionally containing a hetero atom;
R$^{16}$ to R$^{18}$ are the same or different and each represent a substituted or unsubstituted monovalent hydrocarbon group optionally containing a hetero atom;
R$^{19}$ represents a substituted or unsubstituted divalent hydrocarbon group optionally containing a hetero atom; and
X represents a halogen;

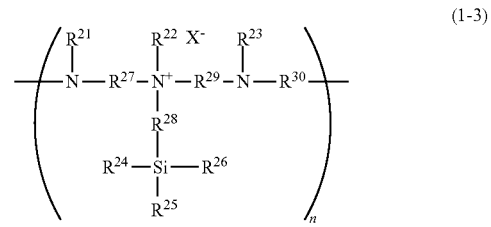

(1-3)

wherein in formula (1-3),
R$^{21}$ to R$^{23}$ are the same or different and each represent a hydrogen atom or a substituted or unsubstituted monovalent hydrocarbon group optionally containing a hetero atom;

$R^{24}$ to $R^{26}$ are the same or different and each represent a substituted or unsubstituted monovalent hydrocarbon group optionally containing a hetero atom;

$R^{27}$ to $R^{30}$ each represent a substituted or unsubstituted divalent hydrocarbon group optionally containing a hetero atom;

X represents a halogen; and n represents the number of repetitions; and wherein the substrate is at least one selected from the group consisting of glass, acrylic resins, cycloolefin resins, carbonate resins, styrene resins, polyester resins, and polydimethylsiloxanes.

2. The hydrophilic substrate according to claim 1, wherein the hydrophilic polymer layer is formed from at least one of a hydrophilic polymer solution or a hydrophilic polymer dispersion.

3. The hydrophilic substrate according to claim 1, wherein the hydrophilic polymer layer is formed of at least one hydrophilic polymer selected from the group consisting of polymers represented by the following formula (I):

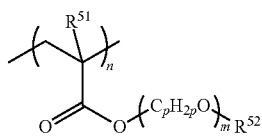

(I)

wherein $R^{51}$ represents a hydrogen atom or a methyl group; $R^{52}$ represents an alkyl group; p represents 1 to 8; m represents 1 to 5; and n represents the number of repetitions.

4. The hydrophilic substrate according to claim 1, wherein the hydrophilic polymer layer is formed of a copolymer of at least one hydrophilic monomer selected from the group consisting of compounds represented by the following formula (II) with another monomer:

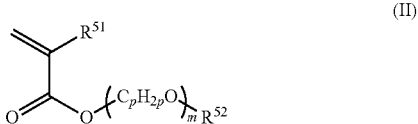

(II)

wherein $R^{51}$ represents a hydrogen atom or a methyl group; $R^{52}$ represents an alkyl group; p represents 1 to 8; and m represents 1 to 5.

5. The hydrophilic substrate according to claim 1, wherein the hydrophilic polymer layer has a thickness of 10 to 1000 nm.

6. The hydrophilic substrate according to claim 1, wherein the hydrophilic polymer layer has fibronectin adsorbed to a surface thereof.

* * * * *